United States Patent [19]
Weddell, III

[11] Patent Number: 6,033,453
[45] Date of Patent: Mar. 7, 2000

[54] RE-USABLE FRAME SUPPORT RACK FOR REPLACEABLE PLEATED-MEDIA FILTER CORE

[76] Inventor: Robert W. Weddell, III, 2320 E. Edgewood, Springfield, Mo. 65804

[21] Appl. No.: 09/015,842

[22] Filed: Jan. 29, 1998

Related U.S. Application Data

[60] Provisional application No. 60/036,616, Jan. 30, 1997.

[51] Int. Cl.[7] .................................................. B01D 27/06
[52] U.S. Cl. ................................ 55/493; 55/497; 55/506; 55/DIG. 31
[58] Field of Search .............................. 55/497, 493, 506, 55/DIG. 31

[56] References Cited

U.S. PATENT DOCUMENTS

| | | | |
|---|---|---|---|
| 5,273,564 | 12/1993 | Hill | 55/497 |
| 5,501,794 | 3/1996 | Van De Graaf et al. | 55/497 |
| 5,509,950 | 4/1996 | Van De Graaf et al. | 55/497 |
| 5,531,892 | 7/1996 | Duffy | 55/497 |
| 5,679,122 | 10/1997 | Moll et al. | 55/497 |
| 5,792,229 | 8/1998 | Sassa et al. | 55/497 |

*Primary Examiner*—David A. Simmons
*Assistant Examiner*—Minh-Chau T. Pham
*Attorney, Agent, or Firm*—Jonathan A. Bay

[57] ABSTRACT

A re-usable frame support rack is provided for supporting and retaining an outstretched, replaceable pleated-media filter core. The pleated-media filter core is of a type that has fold lines extending in a transverse direction and that stretches-out/collapses in the longitudinal direction. The support rack has a frame formed of spaced longitudinal rails extending between spaced transverse rails. The frame carries a pressure-differential support system that provides support, in instances when a pressure differential exists across the frame, to the filter core on a low pressure side thereof. The transverse rails preferably include fingers or like gripping formations for releasably gripping the longitudinal margins of the installed filter core. The longitudinal rails include gates or flaps which have closed and open positions for allowing retention and unobstructed removal in the closed and open positions, respectively, of the longitudinal margins of the installed filter core. Given the foregoing arrangement, the re-usable frame support rack provides convenient removal and replacement of a spent filter core with little fuss.

16 Claims, 2 Drawing Sheets

RE-USABLE FRAME SUPPORT RACK FOR REPLACEABLE PLEATED-MEDIA FILTER CORE

CROSS-REFERENCE TO PROVISIONAL APPLICATION(s)

This application claims the benefit of U.S. Provisional Application No. 60/036,616, filed Jan. 30, 1997.

BACKGROUND AND SUMMARY OF THE INVENTION

The invention generally relates to replaceable air filters, and, more particularly to a re-usable frame support rack for supporting and retaining an outstretched, replaceable pleated-media filter core. The frame support rack in accordance with the invention is available in various standard as well as custom sizes, but generally speaking, it is more advantageous in relatively large sizes as commonly used by commercial, industrial, and municipal users, and not so much by residential users.

Conventional air filters typically comprise a complete package of a filter core and a rigid frame surrounding and permanently attached to the filter core. The filter core is typically formed from conventional filter media. The rigid frame is typically formed from paperboard or the like. Commercial, industrial, and municipal users typically have defined service policies for the replacement of spent air filters after the filters have outlasted their usefulness. These kinds of users typically will keep a stock of fresh conventional filters on supply in a stock room for replacement purposes. Service personnel are responsible for replacing spent filters with fresh filters and then disposing of the spent filters. With conventional filters, each time a filter is replaced a complete package is discarded as refuse, comprising the rigid frame and its attached filter core.

It is an object of the invention to provide a re-usable frame support rack to combine with a replaceable filter core, such as for example a core comprising pleated filter media, in order to provide economy in filter replacement costs, service personnel labor costs, stock room storage space requirements, refuse volume, and so on.

It is known in the art, however, to provide a fixed frame for supporting a pleated-media filter core. To assign reference directions to the pleated-media core, it stretches out in a longitudinal direction, and its pleats or fold-lines extend in a transverse direction. A prior art fixed frame is constructed from a single straight channel piece. In fabrication, the straight channel will be notched at the location of the four corners of the frame. Then the notched straight-channel piece will be bent into the rectangle shape of the frame, and welded or brazed tight. The final frame thus will have opposite longitudinal channel sections facing each other (as well as opposite transverse channel sections too). The spaced, facing channel sections act to cup the spaced longitudinal margins of the outstretched pleated-media filter core.

Given a typical orientation, the opposite longitudinal channel sections usually define the top and bottom borders of the prior art fixed frame. The top and bottom channels protect the pleated media of the filter core from damage during installation of the frame in any given on-site air-handling system. That is, the fixed frame usually installs in the on-site air-handling equipment by sliding into opposed tracks or slideways for it in a filter-station of the on-site air-handling equipment. Therefore, the top and bottom channels of the frame consequently provide the following features:—(i) the top and bottom channels act as bearing surfaces to facilitate sliding in the slideways, and (ii) the top and bottom channels protect the pleated media of the filter core from damage such as being grabbed, torn or otherwise pulled at by the slideways of the on-site air-handling equipment.

There are shortcomings with the prior art fixed frame for pleated-media filter core. The pleated-media filter core can only be loaded and unloaded into the rigidly spaced top and bottom channel sections, and then stretched out between the left and right channels sections, in an awkward way. To load the filter core, the pleated-media must start out substantially collapsed, and then it is placed in the interspace between the top and bottom channels twisted slightly off-angle. The collapsed media is next twisted perpendicular to the opposed top and bottom channels such that its opposite edges insert between and are hence cupped by the opposed top and bottom channels. After that, the pleated-media is stretched out to the left and right extremes, all while its opposite longitudinal edges are sliding in the top and bottom channels to unfold to its fully outstretched use position.

The filter core is unloaded from the prior art frame by the reverse steps. More particularly, the filter core is collapsed by sliding its longitudinal edges in the opposed top and bottom channels until substantially collapsed. The collapsed filter core is then twisted such that its longitudinal edges twist out of the top and bottom channels. Once that has been accomplished, the filter core can be lifted out away from the fixed frame.

In view of the foregoing shortcomings of the prior art, it is an object of the invention to provide a re-usable frame support rack for replaceable pleated-media filter core which allows loading and unloading by means of much less fuss.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE REFERRED EMBODIMENTS

Figure 1:
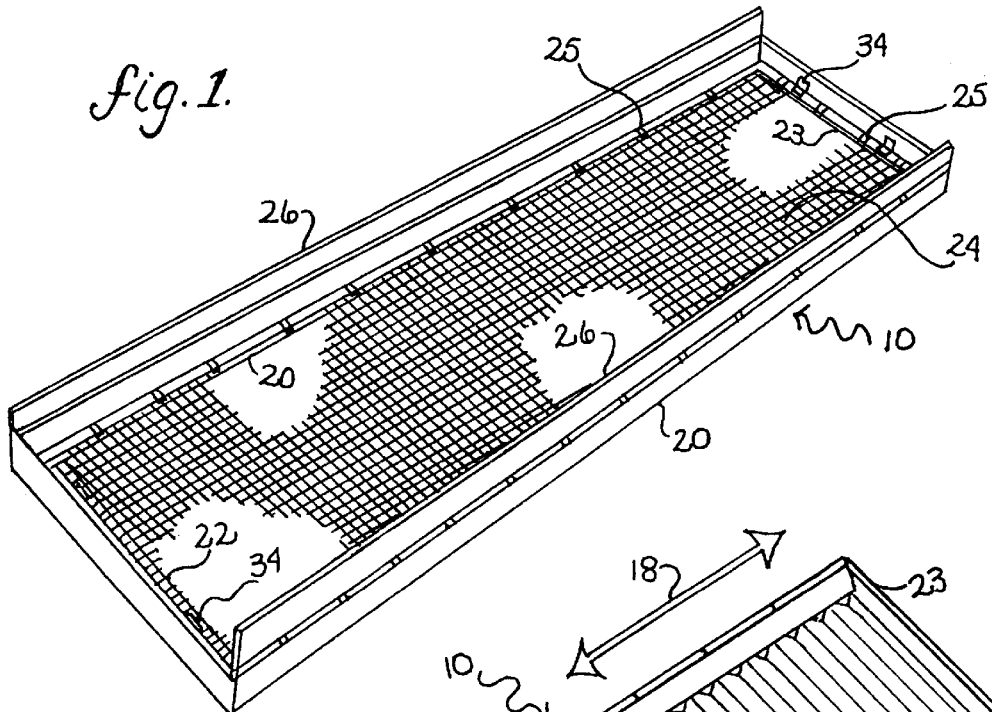
FIG. 1 is a perspective view of an empty, re-usable frame support rack in accordance with the invention, for supporting a replaceable filter core.
Figure 2:
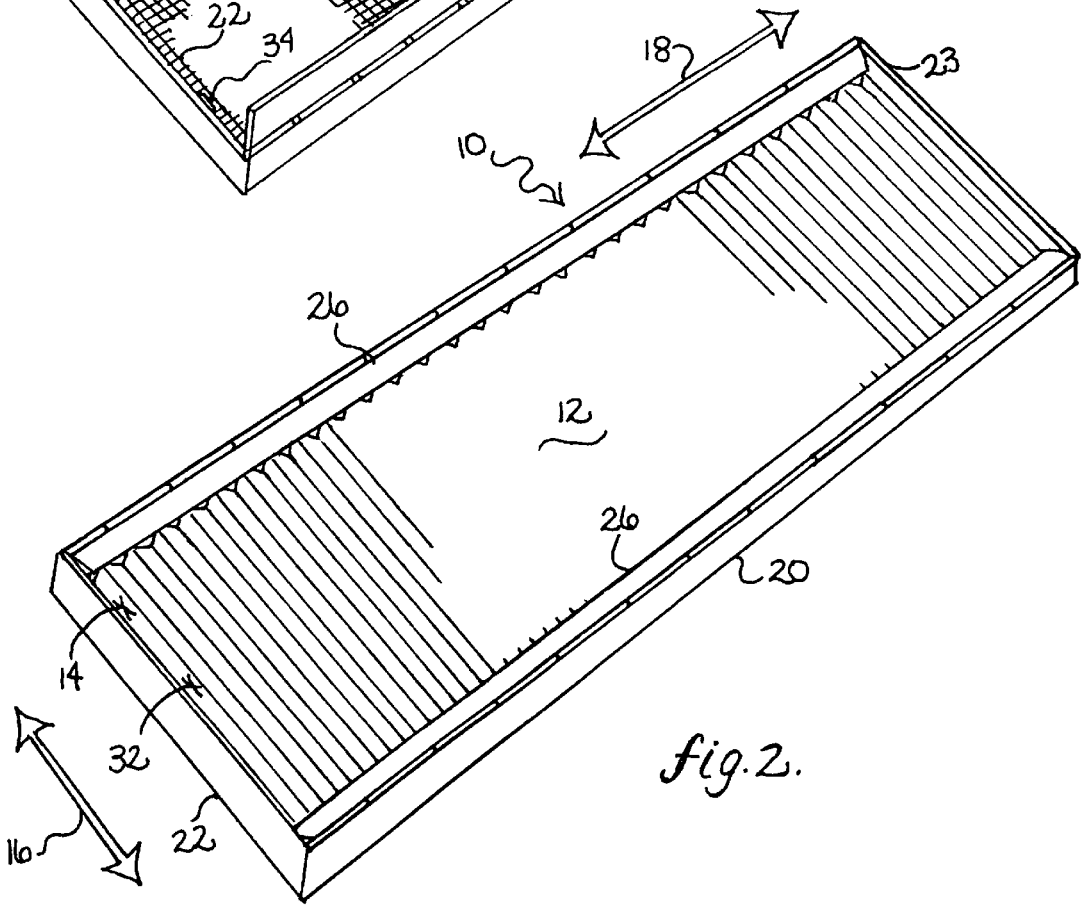
FIG. 2 is a perspective view comparable to FIG. 1, except showing the frame support rack loaded with a replaceable pleated-media filter core.

FIGS. 1 and 2 show a frame support rack 10 in accordance with the invention, for supporting and retaining a replaceable filter core 12. In FIG. 2, the support rack 10 is loaded with a pleated-media 14 filter core 12, whereas in FIG. 1 the support rack 10 is unloaded and empty as the filter core 12 has been removed. The support rack 10 is made from durable materials such as galvanized steel or the like for an indefinitely long life, as for re-use over and over with numerous replaceable filter cores 12.

The frame support rack 10 comprises a pair of relatively elongated longitudinal angles 20 extending between a pair of transverse angles 22–23. These angles 20 and 22–23 of galvanized steel are lapped and fastened or clinch-locked or otherwise affixed together at the corners to form an open-box like frame configuration. Presently it is preferred if the angles 20 and 22–23 are affixed by machine-pressed clinch-lock formations.

In the drawings, the transverse angles 22–23 are shown relatively left and right of each other as the support rack 10 is shown resting on a flat support surface (which is not shown). The support rack 10 can be oriented and/or mounted, however, in any orientation, and accordingly, terms like "longitudinal" and "transverse" or "left" and "right" are used merely for convenience in this description and do not limit the invention to a particular orientation, regardless if in use or at rest between uses.

However, with reference to FIG. 2, the terms "longitudinal" and "transverse" are used in this description—again for purposes of convenience only and not of limitation—to denote the following reference directions relative to the pleated-media filter core 12. The reference direction "longitudinal" is used herein to designate the direction relative to the pleated-media filter core 12 in which it reversibly stretches-out and/or collapses, accordion style. Correspondingly, the reference direction "transverse" is used herein to designate the direction in which the fold- or pleat-lines extend. Hence the pleated-media filter core 12 is expansible and/or collapsible (e.g., accordion style) in the longitudinal direction (indicated by reference numeral 16 in the drawings). In the transverse direction (indicated by reference numeral 18), the pleated-media filter core 12 is relatively rigid. It is significant that, the pleated-media filter core 12 cannot be practicably collapsed or foreshortened in the transverse direction 16 without buckling or damaging it.

The longitudinal and the left and right transverse angles 20 and 22–23 define a rectangular opening between themselves and carry an expanded metal "support" or reinforcement system 24. The expanded metal support system 24 provides—when the filter core 12 is loaded into the frame support rack 10 (as shown by FIG. 2)—support against or oppositions to the tendency of the filter core 12 to buckle or blow out under air pressure or flow when the filter core is pressurized on the opposite side (i.e., the side of the filter core 12 that is in full view in FIG. 2).

The expanded metal support system 24 extends the full span between and overlaps onto the inward flange portion of each of the longitudinal as well as the left and right transverse angles 20 and 22–23 (see FIG. 1). The expanded metal support system 24 is fastened or locked onto these flange portions via punched or lanced tabs 25. The punched or lanced tabs 25 are originally formed to extend straight out from their bases in the flange portions (not shown, but refer to FIG. 3 for an illustration of punched or lanced tab formations 34). Then, after the expanded metal backing 24 has been inserted over the straight-up tabs 25 (not illustrated), the tabs 25 are bent over to lock or retain the expanded metal support system 24 securely to the frame rack 10.

Each longitudinal angle 20 has a piano hinge 26 attached to it. The piano hinges 26 extend substantially the entire length of the longitudinal angle 20 to which each is attached, and form a hinge flap—or in alternative phraseology, a gate or a fence—for it. More particularly, the hinge flaps 26 are one leaf of the piano hinge, the other piano-hinge leaf being secured to the proximate longitudinal angle by clinch lock formations or the like. The hinge flaps 26 are free to swing between extremes of at least an open position as generally shown by FIG. 1, and a closed position as shown by FIG. 2. The whole assembly 10 of angles 20,22–23 and piano hinges 26 are preferably protected against rust or moisture attack with an enamel or a like polymeric—or resinous-material coating.

The support rack 10 defines a box-like frame for supporting and retaining the outstretched filter core 12 as is shown in FIG. 2. The support rack 10 can be produced in any standard and/or custom size. The size for the support rack 10 is presumably predetermined by the air-filtration installation and/or equipment (not shown) which the support rack 10 will service. The filter core 12 size is determined accordingly.

There are certain standard sizes in the industry of air filtration. Standard ranges for the dimension between the longitudinal angles 20 include, without limitation, sixteen, twenty, twenty-four and twenty five inches (forty, fifty, sixty, and sixty-four cm, respectively). The length between the transverse angles 22 and 23 can be about anything, custom or standard, say, for sake of example, about five feet (one and one-half meters) or so. The depth between front and back typically is sized for filter cores that require a two-inch (five cm) depth, although one—as well as four-inch (two and one-half and ten cm) depths are also known.

Closing the hinge flaps 26 as shown in FIG. 2 assists in containing the outstretched filter core 12 in the rack 10. The hinge flaps 26 also provide, among other matters, protection to the proximate longitudinal margins of the pleated media of the filter core 12. The rack 10 and filter core 12 combination are shown ready for installation. In use, the rack 10 is typically installed or mounted by orienting it vertically and sliding it, drawer-like, between opposed tracks or slideways (not shown) for it in at a given filter-station of the on-site air-handling equipment(not shown). Such tracks or slideways are typically sections of channel (not shown). The channel-shaped tracks or slideways (again, not shown) for mounting the rack 10 assist in holding the hinge flaps 26 in their closed positions as shown by FIG. 2. The rack 10 and filter core 12 is preferably oriented relative to the direction of air flow such that hinge flaps 26 are on the upstream or high-pressure side of the filter-station (i.e., which corresponds to a down flow on the rack 10 as it is oriented in FIG. 2).

In use, after the filter media 14 is spent, the filter core 12 ought to be replaced. FIG. 1 shows that the hinge flaps 26 swing open (i.e., or "up" in FIG. 1) and out of the way to allow convenient, unobstructed removal of the spent filter core 12 by lifting it directly out, and without having to collapse the filter core between its left and right edges (left edge or margin indicated as reference numeral 32 in FIG. 4 or 5). Accordingly, the frame support rack 10 is re-usable while the pleated-media 14 filter core 12 is replaceable. In use, this combination of an indefinitely re-usable frame 10 with a replaceable filter core 12 provides numerous advantages, including without limitation the following.

It is economical that the frame 10 is re-usable. Only the filter core 12 is replaced and discarded. In other words, the replacement cost is limited to the cost of the filter core 12, it does not include the reusable frame 10. This situation represents around a 50% savings relative to a conventional package of a rigid paperboard-frame and attached core (not shown). With conventional paperboard-frame filters (again, not shown), the entire package of a filter core and attached frame is disposed of after service.

Another economy provided by the invention is an economy of storage space. There is no practical need to provide storage space for the frame 10 because it is kept at its installation site as if it were accessory equipment for the on-site air-handling equipment (not shown) in which the rack 10 is installed. Only storage space for the replaceable filter cores 12 needs to be provided. The filter cores 12, being formed from a pleated filter media 14, are highly collapsible, accordion-style, to a fraction of their volume when outstretched. A highly collapsed replacement core 12 in accordance with the invention provides about a 90% savings in storage space relative to its conventional counterpart (i.e., the rigid paperboard-frame and attached filter core combination, not shown).

A spent filter core as one like indicated by reference numeral 12, is also 90% less bulky in a refuse bin and/or land fill space relative to its conventional counterpart, because the spent filter core 12 is as just as highly collapsible when spent as when new.

In a situation where one can do the work of three, a lone frame 10 in accordance with the invention allows adaptation for use in situations where the job would ordinarily be handled by three conventional paperboard-frame/filter packs. For example, a filter installation or station having a dimension or cross-section of about five feet by two feet (one and one-half meters by sixty cm) might be serviced by three conventional paperboard-frame/filter packs that measure twenty-four by twenty inches (sixty by fifty cm), as aligned side by side to extend across the whole cross-section. Despite that three side-by-side conventional filter packs would leave gaps between one another, users typically tolerate the gaps for the convenience of stocking and handling three times as many less bulky packs than one measuring the complete five feet by two feet (one and one-half meters by sixty cm). The invention solves the foregoing problem because the only actual bulky component is the frame support rack 10. However, the frame support rack 10 is more or less permanently kept at the installation site and need not travel through the stock room after original installation. Servicing requires—not keeping a supply of bulky frames 10 on hand, but—merely keeping on hand a supply of the highly compact pleated-media filter cores 12.

The invention also provides economy in the cost of labor for servicing spent filter cores 12. The filter cores 12 are packaged for stock room storage in compact packages because the cores are compressed into a highly collapsed state for packaging purposes. This allows service personnel to handle perhaps ten times as many of the highly-collapsed filter cores packages (not shown) relative to conventional paperboard-frame/filter packs, which are perhaps ten times as more bulky. Service personnel are likely to spend fewer out and back trips traveling between filter installations and stock rooms.

The filter media 14 is pleated, which not only gives the filter core 12 extra surface rigidity, but also gives the filter core 12 a longer use-life relative to flat media because the pleated media 14 presents more surface area relative to flat media, perhaps effectively twice as much.

Figure 3:
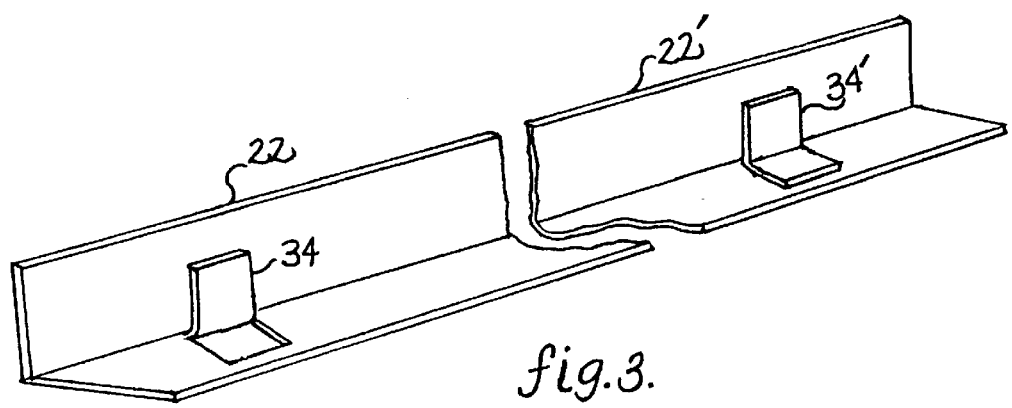
FIG. 3 is an enlarged perspective view of, in isolation, a side angle of the frame support rack (i.e., the left side as the rack is viewed in FIG. 1)
Figure 4:
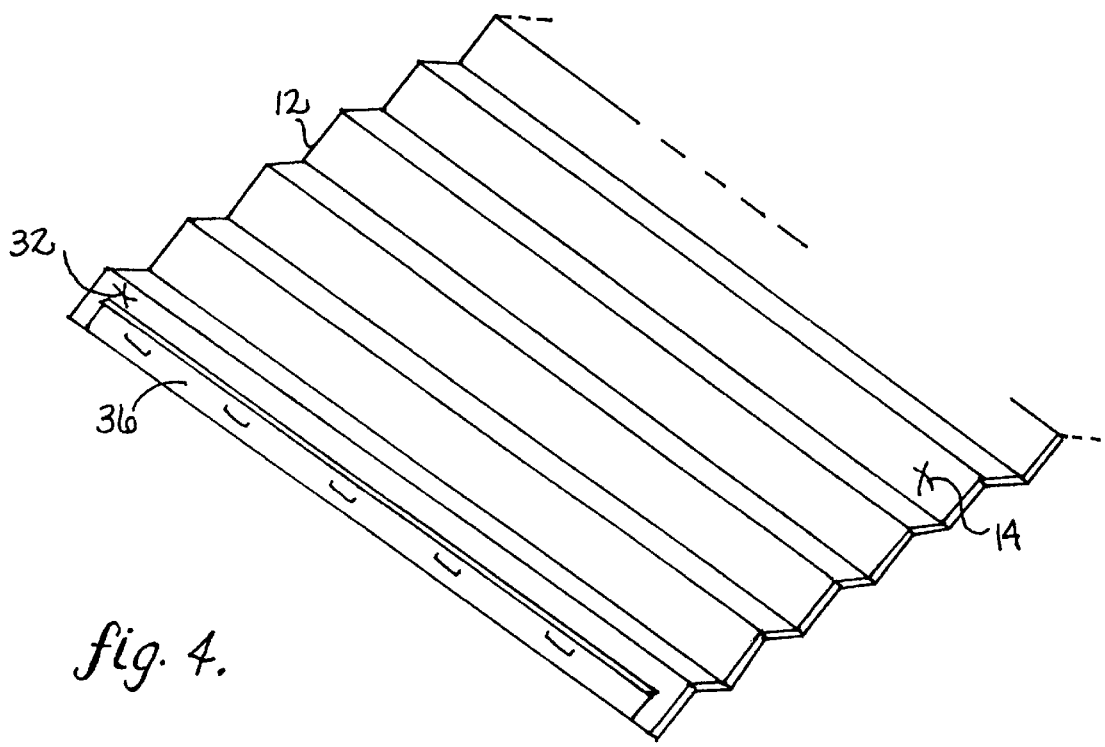
FIG. 4 is a perspective view of pleated filter media, partly outstretched, formed with a terminal edge on the left, and extending to the right with portions broken away out of view (i.e., the reference directions left and right being relative to the vantage point for FIG. 4); and, FIG. 5 is a sectional view showing the interconnection between the side angle of FIG. 3 and the terminal edge of the filter media shown by FIG. 4.
Figure 5:
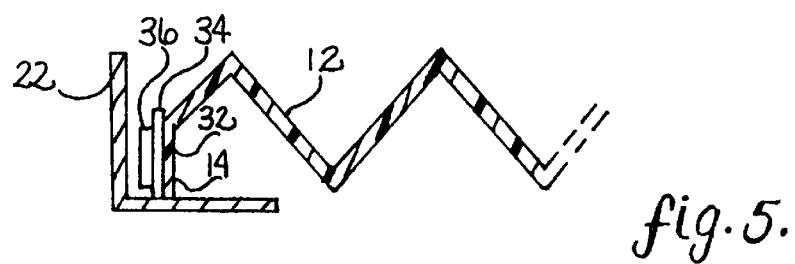

FIGS. 3 through 5 show how one of the opposite transverse edges or edge-margins 32 of a pleated-media 14 filter core 12 (i.e., the left transverse edge and margin is shown, as representative of the opposite right transverse edge and margin, which is not shown) attaches to the corresponding transverse angle 22/22' of the support rack 10. As the invention is shown in FIG. 3, the transverse angle 22/22' can be either (i) formed with sets of punched or lanced tabs as indicated by reference numeral 34, or alternatively, (ii) formed with affixed L-shaped pads as indicated by reference numeral 34'. However, the disclosure of either L-shaped pads 34' or punched or lanced tabs 34 are both shown as non-limiting examples of how to form transverse angle 22/22' with projections or "fingers" to hook or grip the transverse edge or margins 32 of the pleated-media filter core 12. Accordingly, the depiction and description of L-shaped pads 34' and/or punched or lanced sheet metal tabs 34 are used merely for convenience in this description and do not limit the invention to a particular means of retention of the transverse edges. It is conventional, although, to avoid welded bonds with galvanized metal parts because the welding process deteriorates the anti-corrosive protection otherwise provided by galvanized metal. Hence it is preferred if the L-shaped pads 34' are used, and further that the L-shaped pads 34' be attached by means of machine-pressed clinch-lock formations, as mentioned above.

FIG. 4 shows that the filter core 12 has a paperboard strip 36 attached along its transverse edge or margin 32. FIG. 5 shows that the tabs 34 or 34' of the transverse angle 22 or 22' retain the transverse edge (or margin) 32 of the filter core 12 by extending between the paperboard strip 36 and filter media 14. With reference back to FIG. 2, the act of swinging the hinge flaps 26 closed assists in holding the opposite transverse edges 32 of the filter core 12 in position as shown therein.

As previously mentioned, the support rack 10 is typically installed or mounted in the on-site air-handling equipment by sliding it between opposed channel-shaped tracks or slideways for it at a given filter station (this is not shown). The hinge flaps or fences 26 are useful in acting as bearing surfaces for sliding contact with the channel-shaped slideways. Without the flaps or fences 26, the channel-shaped slideways would damage the pleats of the filter core 12 (this also is not shown) by means of grabbing, pinching, tearing, or otherwise pulling at them. Hence it is sufficient that the flaps or fences 26 merely move into their use-or closed-positions as shown by FIG. 2 to provided protection to the pleats against the channel-shaped slideways. The flaps or fences 26 also facilitate sliding contact and hence function as bearing surfaces. It is not necessary that the flaps or fences 26 lock in their use-or closed positions. The channel-shaped slideways (not shown) oppose the flaps or fences 26 from moving out of their use- or closed-positions during the following times or events:—that is, (i) during the time that the frame 10 is installed, (ii) during installation of the frame 10, and (iii) while the frame 10 is being slid out of installation for servicing.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A support rack for loading and unloading with replaceable, pleated-media filter cores that have fold lines extending in a transverse direction and which stretch-out/ collapse in a longitudinal direction, the loaded support rack allowing installation in a filter station of air-handling equipment, the support rack comprising:

a frame comprising spaced longitudinal members extending between spaced transverse members;

ventilated support means carried by the frame for providing support, in instances when a pressure differential exists across the frame, to the filter core on a low pressure side;

the transverse members including retaining means for releasably retaining the proximate transverse edges or edge-margins of the loaded filter core; and, at least one longitudinal member including a flap pivotally attached thereto by means of a piano hinge arrangement, the flap extending longitudinally substantially completely between the spaced transverse members and being pivotal between closed and open positions for allowing retention and unobstructed removal in the closed and open positions, respectively, of the proximate longitudinal margin of the loaded filter core, for protecting, when closed, the proximate longitudinal margins of the pleats of the pleated-media of the filter core from damage during sliding installation of the support rack in slideways for said support rack in the filter station of the air-handling equipment, and, when open, for allowing convenient unloading and replacement of the filter core;

wherein said flap while closed further provides a bearing surface for sliding contact with the slideways of the filter station during sliding installation; and whereby said flap obviates the need for a lock for the closed position because while in the slideways, said slideways oppose the flap's movement out of the closed position.

2. The support rack of claim 1 wherein the flap is one leaf of a piano hinge.

3. The support rack of claim 1 wherein the other longitudinal member also includes a flap pivotally attached thereto by means of a piano hinge arrangement.

4. The support rack of claim 1 wherein the retaining means included with the transverse members comprises a finger.

5. The support rack of claim 1 wherein the ventilated support means comprises a web of expanded metal.

6. The support rack of claim 1 wherein the frame members are angle members fixed together at corners of the frame.

7. A support rack for loading and unloading with replaceable, pleated-media filter cores that have fold lines extending in a transverse direction and which stretch-out/collapse in a longitudinal direction, the loaded support rack allowing installation in a filter station of air-handling equipment, the support rack comprising:

a frame comprising spaced longitudinal rails extending between spaced transverse rails;

the transverse rails including retaining means for releasably retaining the proximate transverse edges or edge-margins of the loaded filter core; and, at least one longitudinal rail including a flap pivotally attached thereto, which flap extends longitudinally substantially completely between the spaced transverse rails, and which can be pivot between use and non-use positions for allowing retention and unobstructed removal in the use and non-use positions, respectively, of the proximate longitudinal margin of the loaded filter core, for protecting, while in the use position, the proximate longitudinal margins of the pleats of the pleated-media of the filter core from damage during sliding installation of the support rack in slideways for said support rack in the filter station of the air-handling equipment, and, when in the non-use position, for allowing convenient unloading and replacement of the filter core;

wherein said flap while in the closed position further provides a bearing surface for sliding contact with the slideways of the filter station during sliding installation; and whereby said flap obviates the need for a lock for the closed position because while in the slideways, said slideways oppose the flap's movement out of the closed position.

8. The support rack of claim 7 wherein the flap comprises one leaf of a piano hinge.

9. The support rack of claim 7 wherein the other longitudinal rail also includes a flap pivotally attached thereto.

10. The support rack of claim 7 further including a ventilated support means carried by the frame for providing support, in instances when a pressure differential exists across the frame, to the filter core on a low pressure side.

11. The support rack of claim 10 wherein the ventilated support means comprises a web of expanded metal.

12. A support rack allowing loading and unloading of replaceable pleated-media filter cores that have fold lines extending in a transverse direction and which stretch-out/collapse in the longitudinal direction, the loaded support rack allowing installation in such a filter station of air-handling equipment that has transversely-spaced, longitudinally-extending channel-shaped slideways; said support rack comprising:

a frame for surrounding peripheral margins of a given pleated-media filter core when stretched out and loaded;

the frame having spaced transverse portions including retaining means for releasably retaining transverse edges or margins of the given loaded pleated-media filter core;

the frame also having spaced longitudinal portions that extend between the transverse portions; each longitudinal portion includes a flap pivotally attached thereto which extends longitudinally substantially completely between the spaced transverse portions, and which can pivot between use and non-use positions for retaining and allowing unobstructed removal in the use and non-use positions, respectively, of the corresponding proximate longitudinal margin of the installed pleated-media filter core, for protecting, while in the use position, the proximate longitudinal margin of the pleats of the pleated-media of the filter core from damage during sliding installation of the support rack in the channel-shaped slideways of the filter station, and, when in the non-use position, for allowing convenient unloading and replacement of the filter core;

wherein each flap while in the closed position further provides a bearing surface for sliding contact with the channel-shaped slideways of the filter station during sliding installation; and whereby said flaps obviate the need for locks for each flap's closed position because while in the slideways, said slideways oppose the movement of the flaps out of each's closed position.

13. The support rack of claim 12 wherein each flap comprises one leaf of a piano hinge.

14. The support rack of claim 12 wherein the retaining means included with the transverse portions comprises a finger.

15. The support rack of claim 12 further including a ventilated support means carried by the frame for providing support, in instances when a pressure differential exists across the frame, to the filter core on a low pressure side.

16. The support rack of claim 12 wherein the spaced transverse and longitudinal portions comprised spaced transverse and longitudinal rails arranged and fixed together to define a rectangular shape.

* * * * *